United States Patent
Dottax et al.

(10) Patent No.: US 10,721,081 B2
(45) Date of Patent: Jul. 21, 2020

(54) METHOD AND SYSTEM FOR AUTHENTICATION

(71) Applicant: OBERTHUR TECHNOLOGIES, Colombes (FR)

(72) Inventors: Emmanuelle Dottax, Colombes (FR); Francis Chamberot, Colombes (FR); Bruno Climen, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 251 days.

(21) Appl. No.: 15/740,781

(22) PCT Filed: Jun. 28, 2016

(86) PCT No.: PCT/EP2016/065059
§ 371 (c)(1),
(2) Date: Dec. 28, 2017

(87) PCT Pub. No.: WO2017/001430
PCT Pub. Date: Jan. 5, 2017

(65) Prior Publication Data
US 2018/0191511 A1    Jul. 5, 2018

(30) Foreign Application Priority Data
Jun. 30, 2015   (EP) .................... 15306057

(51) Int. Cl.
| | |
|---|---|
| H04L 9/32 | (2006.01) |
| G06Q 20/40 | (2012.01) |
| G06Q 20/38 | (2012.01) |
| G06Q 20/34 | (2012.01) |
| H04L 9/14 | (2006.01) |

(52) U.S. Cl.
CPC .......... *H04L 9/3271* (2013.01); *G06Q 20/34* (2013.01); *G06Q 20/382* (2013.01); *G06Q 20/409* (2013.01); *H04L 9/14* (2013.01); *H04L 9/3234* (2013.01)

(58) Field of Classification Search
CPC ....... H04L 9/3271; H04L 9/3234; H04L 9/14; G06Q 20/34; G06Q 20/382; G06Q 20/409
USPC ........................................... 713/172
See application file for complete search history.

(56) References Cited

U.S. PATENT DOCUMENTS

| | | | |
|---|---|---|---|
| 6,535,980 B1 * | 3/2003 | Kumar | H04L 9/3228 380/278 |
| 2012/0089837 A1 * | 4/2012 | Chandrasekaran | H04L 9/00 713/169 |

OTHER PUBLICATIONS

International Search Report, dated Jul. 28, 2016, from corresponding PCT application No. PCT/EP2016/065059.

\* cited by examiner

*Primary Examiner* — Kambiz Zand
*Assistant Examiner* — Aubrey H Wyszynski
(74) *Attorney, Agent, or Firm* — Young & Thompson

(57) ABSTRACT

An authentication method is performed between a first party and a second party. The method includes: i) determining a challenge; ii) sending the challenge to the second party; receiving a response from the second party including a second cryptogram; computing a first cryptogram using the challenge and the key of the first party; determining if the first cryptogram matches the second cryptogram received from the second party. If the first cryptogram does not match the second cryptogram, the method further includes performing a computation using the first cryptogram and the second cryptogram; and comparing a result of the computation with a stored set of results to recover a first data element carried by the second cryptogram.

20 Claims, 10 Drawing Sheets

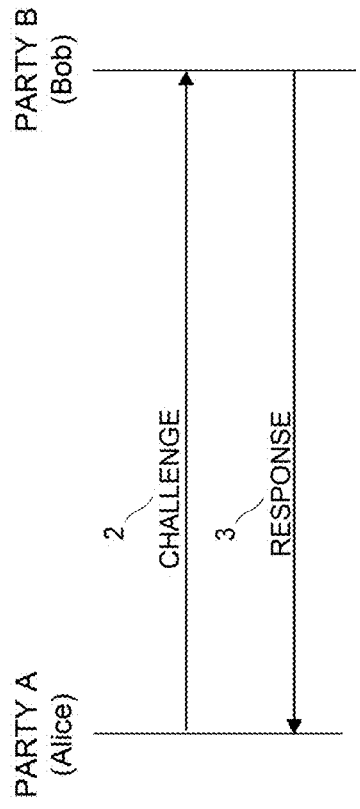
Fig. 1
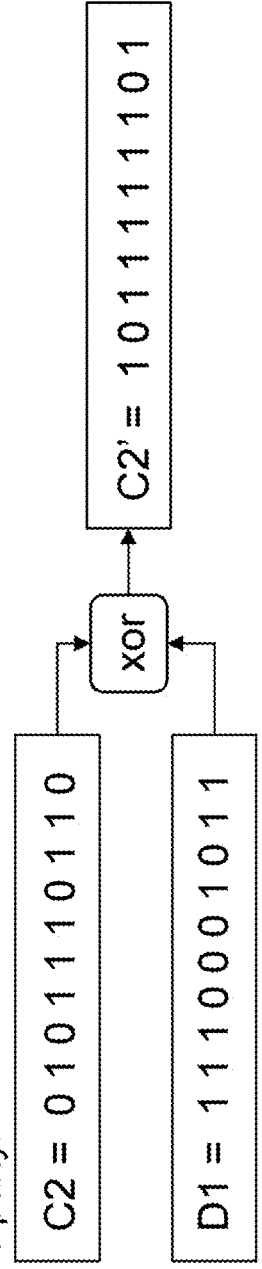
Fig. 3
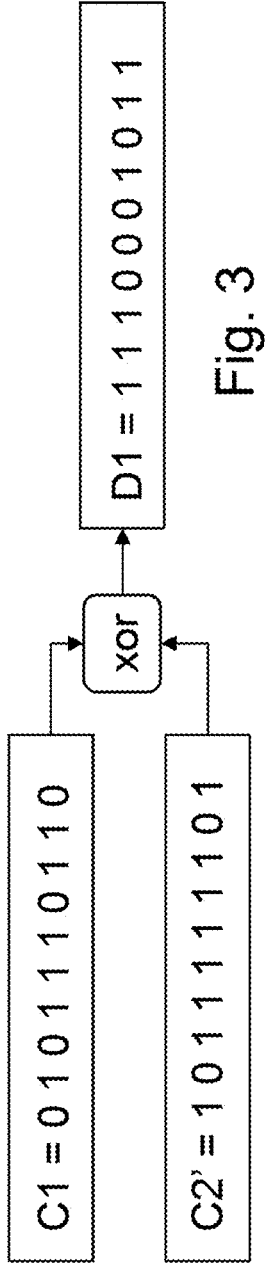

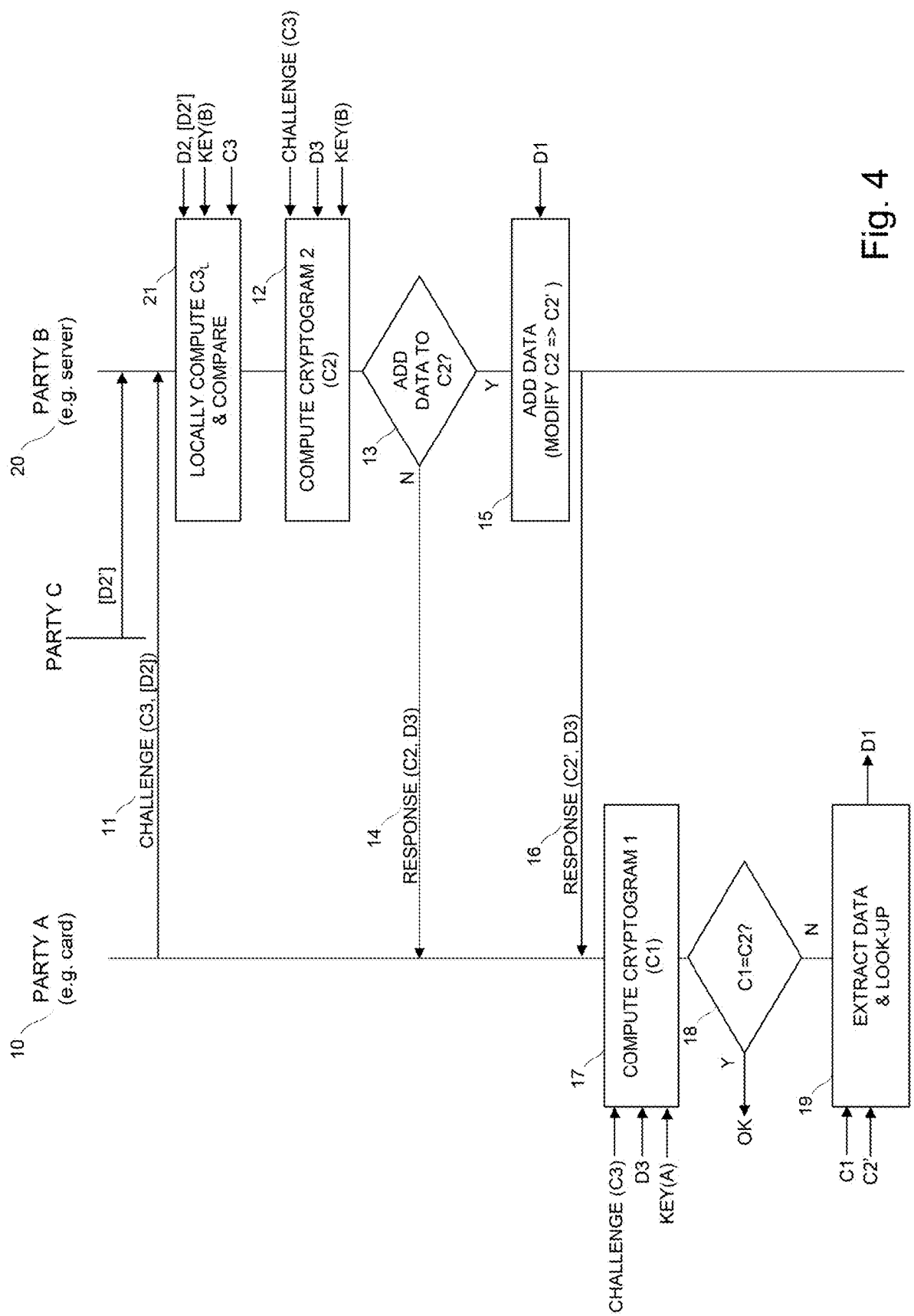

| Op type | Op code |
|---|---|
| T1 | OP1 |
| T2 | OP2 |
| T3 | OP3 |
| | |
| | |

Fig. 8

| Op code | Entry point |
|---|---|
| OP1 | exec (OP1) |
| OP2 | exec (OP2) |
| OP3 | exec (OP3) |
| | |
| | |

Fig. 7

METHOD AND SYSTEM FOR AUTHENTICATION

BACKGROUND

A challenge-response exchange between parties is used in various authentication protocols. FIG. 1 shows a simple example. Alice sends Bob a challenge 2, such as a message containing a string of characters "MQR" for example. Bob transforms this string using a cryptographic algorithm, T, with a key, k: T("MQR", k) to produce a response "SAT" for example. Bob sends the response 3 to Alice. Alice executes the same algorithm with her copy of the key, k': T("MQR", k'). If Alice obtains the same result as Bob's response, "SAT", she knows that Bob has a copy of her key, k'. When a match is found, it can be said that the response fits the challenge. This kind of exchange finds applications in many authentication protocols. For any given challenge there is only one response that fits.

Integrated Circuit Cards (ICC) can use a challenge-response exchange as part of a communication exchange between the card and a server.

SUMMARY

An aspect of the invention provides an authentication method performed between a first party and a second party, wherein the first party has a first key and the second party has a second key, the method comprising, at the first party:

(i) determining a challenge;
(ii) sending the challenge to the second party;
(iii) receiving a response from the second party comprising a second cryptogram;
(iv) computing a first cryptogram using the challenge and the key of the first party;
(v) determining if the first cryptogram matches the second cryptogram received from the second party; and
if the first cryptogram does not match the second cryptogram, further comprising:
  performing a computation using the first cryptogram and the second cryptogram; and
  comparing a result of the computation with a stored set of results to recover a first data element carried by the second cryptogram.

Performing a computation using the first cryptogram and the second cryptogram may comprise performing a bit-wise operation between the first cryptogram and the second cryptogram.

The bit-wise operation may be an exclusive OR, XOR, operation.

The first data element may be indicative of a security action to be performed by the first party. The method may further comprise performing the security action according to the value of the recovered first data element.

The stored set of results may correspond to operation codes.

The first data element may be received as part of a command received at the first party. The data element may be used to perform an action at the first party before sending a response externally of the first party.

The stored set of results may be a set of operation codes encrypted using a further key. Performing a computation using the first cryptogram and the second cryptogram provides an encrypted value which is encrypted using a key corresponding to the further key.

The challenge may comprise a second data element.

The challenge may comprise a third cryptogram computed using a second data element and the key of the first party. The response from the second party may further comprise a third data element; and step (iv) may comprise computing the first cryptogram using the third cryptogram, the third data element and the key of the first party.

The third cryptogram may be the same length as the first cryptogram and/or the second cryptogram.

The third cryptogram may be an Authorisation Request Cryptogram, ARQC.

The second cryptogram may be an Authorisation Response Cryptogram, ARPC.

The second data element may be transaction data.

The third data element may be an Authorisation Response Code, ARC.

The first party may be an integrated circuit card, ICC. The second party may be an authorisation entity, such as a card issuer or bank. The method may be a transaction authorisation method between the integrated circuit card and the authorisation entity.

Another aspect of the invention provides an authentication method performed between a first party and a second party, wherein the first party has a first key and the second party has a second key, the method comprising, at the second party:

(i) receiving a challenge from the first party;
(ii) computing a second cryptogram using the challenge and the key of the second party;
(iii) determining if the second cryptogram is required to carry a first data element;
if the second cryptogram is not required to carry the first data element, sending the second cryptogram to the first party; and
if the second cryptogram is required to carry the first data element:
  performing a computation of the second cryptogram with the first data element to produce a modified second cryptogram; and
  sending the modified second cryptogram to the first party, wherein the first data element is recoverable from the modified second cryptogram by the first party.

Performing a computation of the second cryptogram with the first data element may comprise performing a bit-wise operation between the second cryptogram and the first data element.

The first data element may be indicative of a security action to be performed by the first party.

The challenge may comprise a third cryptogram. Step (ii) may comprise computing the second cryptogram using the third cryptogram, a third data element and the key of the second party. The method may further comprise sending the third data element to the first party.

Another aspect of the invention provides apparatus for use at a first party comprising a processor and a memory, the memory containing instructions executable by the processor whereby the apparatus is configured to:

(i) determine a challenge;
(ii) send the challenge to a second party;
(iii) receive a response from the second party comprising a second cryptogram;
(iv) compute a first cryptogram using the challenge and a key of the first party;
(v) determine if the first cryptogram matches the second cryptogram received from the second party; and
if the first cryptogram does not match the second cryptogram further comprising:

perform a computation using the first cryptogram and the second cryptogram; and compare a result of the computation with a stored set of results to recover a first data element carried by the second cryptogram.

This aspect of the apparatus may be configured to perform any of the described or claimed methods relating to the first party.

Another aspect of the invention provides apparatus for use at a second party comprising a processor and a memory, the memory containing instructions executable by the processor whereby the apparatus is configured to:

(i) receive a challenge from a first party;

(ii) compute a second cryptogram using the challenge and a key of the second party;

(iii) determine if the second cryptogram is required to carry a first data element;

if the second cryptogram is not required to carry the first data element, send the second cryptogram to the first party; and if the second cryptogram is required to carry the first data element:

perform a computation of the second cryptogram with the first data element to produce a modified second cryptogram; and send the modified second cryptogram to the first party, wherein the first data element is recoverable from the modified second cryptogram by the first party.

This aspect of the apparatus may be configured to perform any of the described or claimed methods relating to the second party.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described or claimed methods. The machine-readable instructions may be stored on an electronic memory device, hard disk, optical disk or other machine-readable storage medium. The machine-readable medium can be a non-transitory machine-readable medium. The term "non-transitory machine-readable medium" comprises all machine-readable media except for a transitory, propagating signal. The machine-readable instructions can be downloaded to the storage medium via a network connection.

An advantage of at least one example of the disclosure is that the "response" part of a challenge-response exchange between a first party and a second party can carry a data element. The data element can be used to convey information, or a command, which can instruct the first party to perform an action, such as a security-related action.

BRIEF DESCRIPTION OF THE DRAWINGS

Embodiments of the invention will be described, by way of example only, with reference to the accompanying drawings in which:

FIG. 1 shows a challenge-response exchange;

FIG. 3 shows examples of bit-wise operations performed at the first party and the second party;

FIG. 4 shows another example communication exchange with the option of adding data to the response;

FIG. 7 shows a table used at a first party;

FIG. 8 shows a table used at a first party;

DETAILED DESCRIPTION

Figure 2:
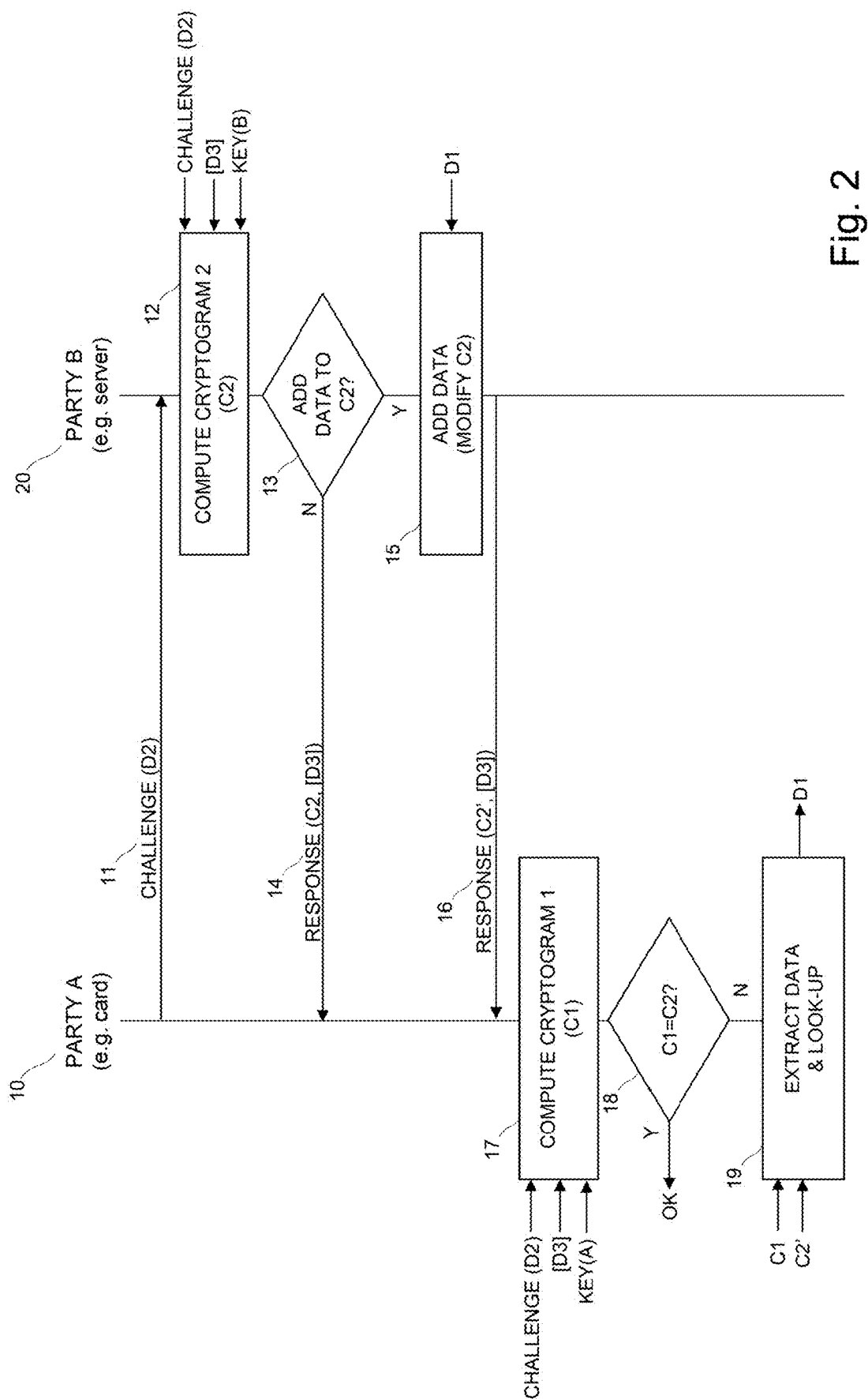
FIG. 2 shows an example communication exchange with the option of adding data to the response.

FIG. 2 shows an example of an authentication method performed between a first party 10 and a second party 20. Examples of the first party 10 include an integrated circuit card (ICC), a communication terminal, or a secure element within a communication terminal. At least one other party may participate in the exchange between the first party 10 and the second party 20, such as an intermediate party (e.g. a card reader). Examples of the second party 20 include a server or other entity. Only the first party 10 and second party 20 are described. The first party 10 has a first key (Key A) and the second party has a second key (Key B). The first key (Key A) and the second key (Key B) may be symmetric keys, or may be asymmetric keys. The first party 10 determines a challenge 11 to be sent to the second party 20. In this example, the challenge 11 includes a data element D2. For example, the data element D2 can be a random number generated by the first party. The first party sends the challenge 11 to the second party 20.

The second party 20 receives the challenge 11 comprising the data element D2. The second party 20 computes a cryptogram C2 using the challenge D2 and the key of the second party (Key B). The second party 20 determines, at block 13, if the cryptogram C2 is required to carry a first data element D1. If the cryptogram C2 is not required to carry the second data element D1, the second party sends the cryptogram C2 to the first party 10.

If the cryptogram C2 is required to carry the data element D1, the second party performs a computation of the cryptogram C2 with the data element D1 to form a modified cryptogram C2'. As will be explained below, this can be a bit-wise operation, such as an exclusive OR (xor) operation between the cryptogram C2 and the data element D1. The second party sends the output of the computation of the cryptogram C2 with the data element D1 to the first party. As will be described below, the data element D1 is recoverable from the cryptogram C2' by the first party.

The first party 10 receives a response 14 or 16 from the second party 20. The response comprises either: a cryptogram C2; or a modified cryptogram C2'. Initially, the first party does not know what type of response 14, 16 it is receiving. At block 17 the first party computes a cryptogram C1 using the challenge and the key of the first party (Key A). The first party then determines, at block 18, if the cryptogram C1 calculated at the first party matches the cryptogram C2 received from the second party. If the cryptogram C1 does match the cryptogram C2, this indicates that the second party 20 owns the key (Key B) corresponding to the key (Key A) held by the first party 10. As the keys have been securely distributed, the second party is authenticated with respect to the first party.

If the cryptogram C1 does not match the cryptogram C2, two possible reasons are:

(i) the second party 20 is using the wrong key (e.g. because they are a fraudulent party);

(ii) the second party 20 has encoded the cryptogram C2 with a data element D1.

At block 19, the first party 10 performs a test to attempt to recover a data element carried by the cryptogram C2'. Block 19 performs a computation using the cryptogram C1 and the cryptogram C2'. The computation can be a bit-wise operation, such as an exclusive OR (xor) operation between the cryptograms C1 and C2'. The operation performed at block 19 is complementary to the operation performed at block 15. A result of the computation is compared with a stored set of results. If a match is found between the result of the computation and an entry in the stored set of results, this indicates a data element D1 which was added by the second party 20 at block 15. Therefore, the first party 10 has recovered the data element D1.

If a match is not found between the result of the computation and an entry in the stored set of results, this may indicate the second party 20 is using the wrong key (e.g. because they are a fraudulent party).

FIG. 3 shows an example bit-wise operation performed at blocks 15 and 19 of FIG. 2. These examples show short 10-bit cryptograms C1, C2, C2' and a 10-bit data element D1. The cryptograms C1, C2, C2' and the data element D1 are the same length. An actual cryptogram will typically be much longer than the short examples shown here, such as 64 bits long. At block 15 of FIG. 2, the second party 20 performs a bit-wise exclusive OR (xor) operation between the cryptogram C2 and the data element D1 to produce the modified cryptogram C2'. At block 19 the first party 10 performs a bit-wise exclusive OR (xor) operation between the cryptogram C1 and the cryptogram C2' to recover the data element D1. The example shows that the data element D1 added by the second party is recovered by the first party.

In another example, the data element D1 could be shorter than the cryptogram C2. For example, the data element D1 could be reduced to 32 bits. Advantageously, the data element D1 should not be so short as to allow a brute force attack aimed at discovering the data element D1. In practice, minimum lengths of cryptographic keys and similar increase as computing power increases. Thus, a 64-bit cryptogram with a minimum 32-bit op-code might be seen as adequate today but may be considered too short in the near future. When the data element D1 is shorter than the cryptograms C1, C2 with which it is combined, some alignment is required. That is, the second party 20 needs to align the data element D1 with some feature of the cryptogram C2. Examples of possible alignments are: an end (i.e. the first bit of D1 is aligned with the first bit of C1/C2, or the last bit of D1 is aligned with the last bit of C1/C2); or at any other point provided that the cryptogram entirely 'covers' the op code. The first party 10 and the second party 20 should use the same alignment strategy.

There are some possible alternatives to the scheme shown in FIG. 2. A further data element D3 can be used in the exchange. At block 12, a third data element D3 is used in the computation of the cryptogram C2. The response 14, 16 sent to the first party includes the data element D3 in addition to the cryptogram C2. At block 17, the first party computes the cryptogram C1 using the data element D3 in addition to the quantities previously described.

Another possible alternative to the scheme of FIG. 2 is shown in FIG. 4. Corresponding features between FIGS. 2 and 4 are shown with corresponding labels. The challenge 11 sent by the first party 10 to the second party 20 comprises a cryptogram C3. The cryptogram C3 can be computed by the first party 10 over data which includes at least one data element D2. The first party 10 sends the challenge 11 (cryptogram C3) to the second party 20. At block 21, the second party locally computes cryptogram $C3_L$ in the same way party A used to create cryptogram C3. That is, the second party computes $C3_L$ using the same at least one data element D as the first party. The locally computed cryptogram $C3_L$ is compared with the received cryptogram C3. If a match is found, the method proceeds to block 12. The second party 20 may receive the at least one data element D2 with the challenge 11. Other possibilities are that the first party does not send the at least one data element D2 to the second party. Instead, the at least one data element D2 may be received from a third party (PARTY C) with, before, or after, the challenge 11.

At block 12, the second party computes the cryptogram C2 using the cryptogram C3 (or $C3_L$) and the key of the second party (key B). Additionally, the second party computes the cryptogram C2 using data element D3.

Blocks 13 and 15 are the same as previously described. The second party 20 determines, at block 13, if the cryptogram C2 is required to carry a data element D1. If the cryptogram C2 is not required to carry the data element D1, the second party sends the cryptogram C2 to the first party 10. If the cryptogram C2 is required to carry the data element D1, the second party performs a computation of the cryptogram C2 with the data element D1 to form a modified cryptogram C2'.

The first party 10 receives a response 14 or 16 from the second party 20. The response comprises either: a cryptogram C2; or a modified cryptogram C2'. At block 17 the first party computes a cryptogram C1 using the challenge and the key of the first party. Block 17 uses the cryptogram C3. If data element D3 is also used in the scheme, block 17 also uses D3 as an input to the computation of the cryptogram C1. The first party then determines, at block 18, if the cryptogram C1 calculated at the first party matches the cryptogram C2 received from the second party. If the cryptogram C1 does match the cryptogram C2, this indicates that the second party 20 owns the key (KEY B) corresponding to the key (KEY A) held by the first party 10. As the keys have been securely distributed, the second party is authenticated with respect to the first party.

If the cryptogram C1 does not match the cryptogram C2, the method proceeds to block 19. At block 19, the first party 10 performs a computation using the cryptogram C1 and the cryptogram C2'. The computation can be a bit-wise operation, such as an exclusive OR (xor) operation between the cryptograms C1 and C2'. The operation performed at block 19 is complementary to the operation performed at block 15. A result of the computation is compared with a stored set of results. If a match is found between the result of the computation and an entry in the stored set of results, this indicates a data element D1 which was added by the second party 20 at block 15. Therefore, the first party 10 has recovered the data element D1.

EMV

One application of the method shown in FIG. 4 is as part of a communication exchange between an integrated circuit card (ICC) and an authorisation entity, via a card reader positioned between the card and the authorisation entity. One existing protocol for communication exchange between an ICC, a card reader and an authorisation entity is defined by Europay, MasterCard and Visa (EMV).

Figure 5:
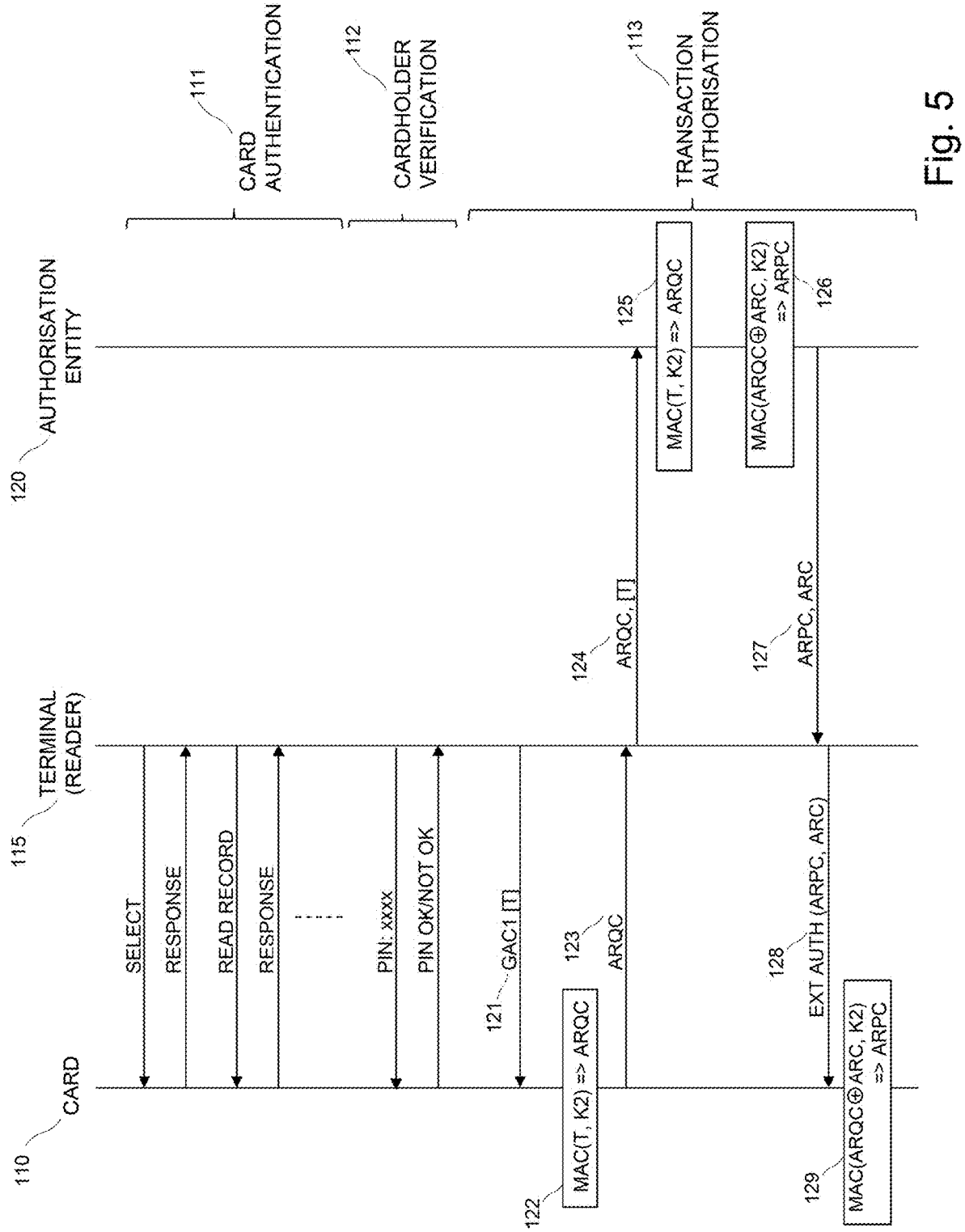
FIG. 5 shows a known communication exchange between an integrated circuit card (ICC), a card reader and an authorisation entity.

Before describing an example of an EMV communication exchange using the method of FIG. 4, it is helpful to review a known EMV communication exchange for a payment transaction in FIG. 5. The entities shown in FIG. 5 are a card (ICC, 110), a terminal 115 and an authorisation entity 120. Other names for a terminal 115 are a card reader, payment terminal or point of sale (PoS) terminal. The authorisation entity 120 may be an issuer of the card, or some other entity acting on behalf of the card issuer. The card 110 corresponds to the first party 10 and the authorisation entity 120 corresponds to the second party 20 in FIG. 4. The card reader is an intermediate entity in the exchange between the card/first party and the authorisation entity/second party. The exchange between the card 110, reader 115 and authorisation entity 120 provides details of a payment transaction (e.g. when a user purchases goods or services) to the authorisation entity 120. The authorisation entity 120 decides whether to allow or to refuse the transaction. Three stages of the exchange include: card authentication 111; cardholder verification 112; and transaction authorisation 113.

As there may be more than one application on the card 110, the reader 115 begins by selecting an 'entry point'. The card 110 responds with a list of applications supported by the card. The reader 115 then selects a specific application from the list. In the exchanges which follow, the reader receives an indication of the files that need to be read to complete the transaction. As part of the card authentication stage 111, the reader retrieves the card PAN (Primary Account Number) and Expiry Date. The cardholder is verified at stage 112 by checking a Personal Identification Number (PIN) entered by a user of the card at terminal 115.

A transaction authorisation process 113 includes the reader 115 sending the card 110 a GAC (Generate Authentication Cryptogram) command 121. As this is the first of two GAC commands sent to the card, it is referred to as GAC1. The command is a request to the card to generate a cryptogram. The cryptogram is computed by applying a keyed, cryptographic hash-algorithm to the transaction data. As a generality cryptographic hashing algorithms may be used with or without a cryptographic key. In the EMV exchange, a key is needed. In the case where the keys used by the card 110 and authorisation entity are asymmetric, the computation of the cryptogram can use a signature algorithm. In the case where the keys are symmetric, the computation of the cryptogram can use a Message Authentication Code (MAC) algorithm. In an example, the MAC-algorithm is:

MAC-algorithm($T,K2$)

where T is transaction data and K2 is a key of the card. The transaction data can comprise at least the amount, the currency, and the date of the transaction.

To avoid replay attacks, the key K2 is generated anew for each transaction. This known process is generally referred to as key derivation, and the functions that do the work are known as key-derivation-functions or kdf. A kdf is also used to produce a key that is unique to each card:

$kdf$(PAN,$K0$)=>$K1$

The issuing bank holds a master key, K0. The master key, K0, is used to generate the card key K1 based on the PAN (Primary Account Number). K1 is generated during the first steps of card personalisation and stored in non-volatile memory. It remains the same throughout the life of the card. K2 is generated using the K1 and an Application Transaction Counter (ATC). As the value of the ATC increments with each transaction, K2 is unique to a particular transaction:

$kdf$(ATC,$K1$)=>$K2$

In general new keys for specific purposes are derived from the card key, K1:

$kdf$(diversification-data,$K1$)=>$K_n$

Possible kdf functions include triple-DES and AES. The diversification data may be any data that is known to both parties using the key. This follows from the fact that key derivation has to be an agreed procedure to allow the recipient of an encrypted message to generate the correct key to be able to decrypt the message.

At block 122 the card generates the Authentication Request Cryptogram, ARQC using transaction data T and the key K2:

MAC-algorithm(amount,currency,date, . . . , $K2$)=>ARQC

Further detail of this step is described in the EMV Book 2 "Security and Key Management" at section 8.1 "Application Cryptogram Generation". The card sends the ARQC to the reader at 123. At 124, the reader sends the ARQC along with the transaction data T to the authorisation entity 120. In this example, the transaction data T is sent to the authorisation entity 120 by the reader 115. Generally, in an EMV transaction some items of transaction data (e.g. card number, expiry date) originate at the card and some items of transaction data originate at the reader (e.g. transaction amount, currency). Some items of transaction data may be sent from the reader 115 to the card 110 to allow the card 110 to generate the ARQC over these items at block 122. The reader may send items of transaction data as part of the GAC1 121. Transaction data T may be forwarded from the reader 115 to the authorisation entity 120 along with the ARQC at 124. Alternatively, the transaction data may be sent separately from the ARQC. The authorisation entity 120 uses the transaction data T to regenerate the ARQC at block 125, i.e. authorisation entity 120 uses the same data inputs (T, K2) as the card 110 to regenerate the ARQC.

The authorisation entity 120 already has a copy of K0 and therefore it can regenerate the key K2 used by the card. At block 125 the authorisation entity locally generates the cryptogram ARQC sent to it by the card. If the re-generated cryptogram $ARQC_L$ and incoming cryptogram ARQC match, the cryptogram is deemed authentic. The authorisation entity operates its own internal checks on the card holder's account to decide whether or not to authorise the transaction. The result of this process is an Authorisation Response Code (ARC) to indicate that the transaction is accepted or the transaction is declined.

At block 126 the authorisation entity prepares the response to the ARQC. This is typically an eight-byte MAC, which can be calculated over ARQC $\oplus$ ARC:

MAC-algorithm(ARQC$\oplus$ARC,$K2$)=>ARPC where ARQC $\oplus$ ARC is a bit-wise exclusive OR (xor) operation between ARQC (typically 8 bytes) and ARC (typically 2 bytes, padded to 8 bytes). There are other possible ways of computing an ARPC.

The reader forwards the ARPC and ARC in an EXTERNAL AUTHENTICATE command 128.

At block 129 the card verifies the ARPC and ARC received from the issuer in the EXTERNAL AUTHENTICATE command:

if MAC-algorithm(original-ARQC⊕ARC, K2)=ARPC,OK where original-ARQC ⊕ ARC is a bit-wise exclusive OR (xor) operation between the ARQC originally computed by the card (typically 8 bytes) and the ARC (typically 2 bytes, padded to 8 bytes) received from the authorisation entity. As noted above, there are other possible ways of computing an ARPC. Blocks 126 and 129 can use different computation algorithms compared to the ones described here. However, blocks 126 and 129 use the same computation algorithm.

If the transaction was authorised by the bank, the card returns a transaction certificate (TC) to the reader, which the reader forwards to the authorisation entity.

Figure 6:
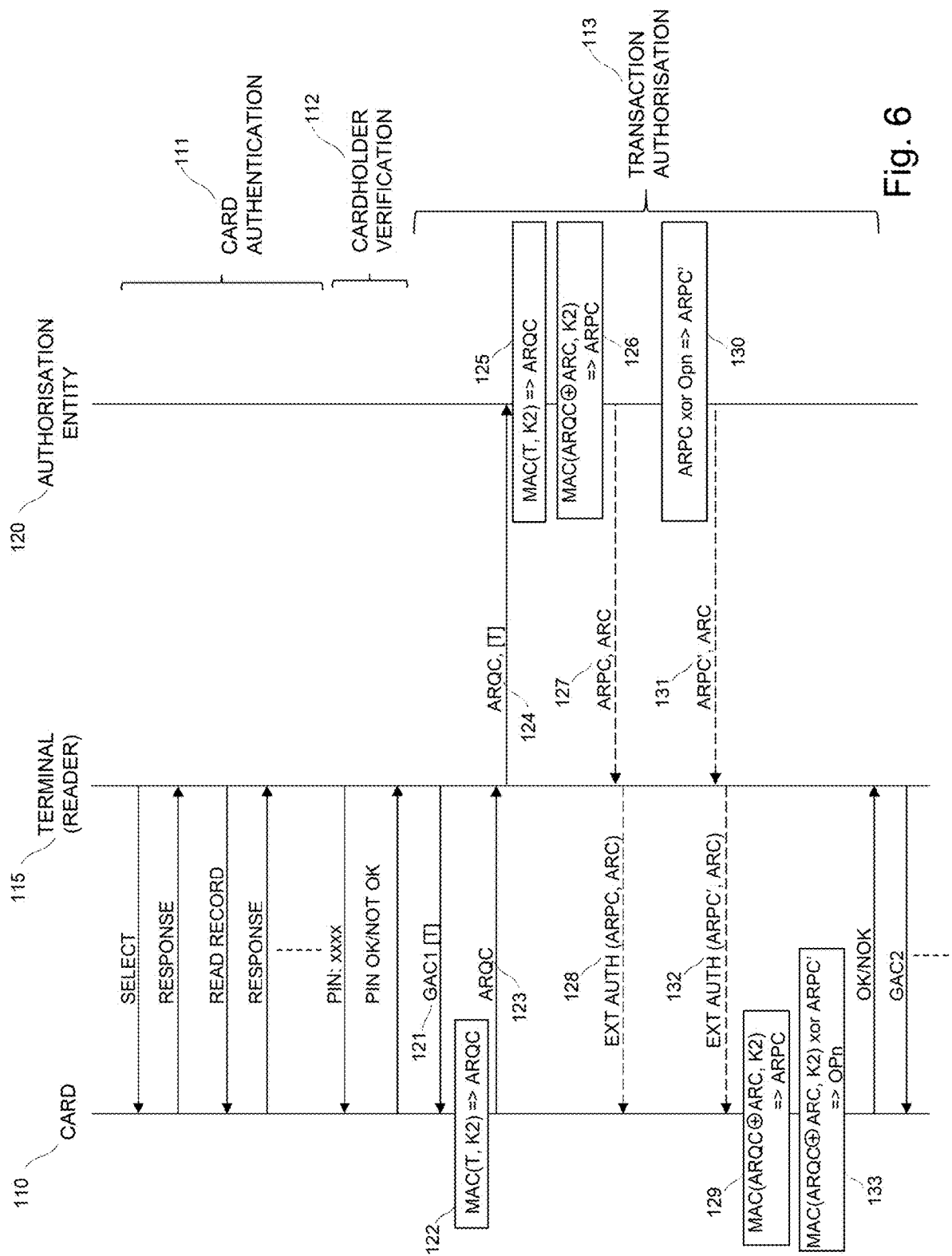
FIG. 6 shows a modified communication exchange between an integrated circuit card (ICC), a card reader and an authorisation entity.

FIG. 6 shows an EMV communication exchange of the type of FIG. 5, modified to include the features of FIG. 4 where a data element is combined with a cryptogram before sending it to the first party. The ARQC cryptogram and the corresponding ARPC response from the authorisation entity are, from a functional point of view, a challenge and response. The challenge is the ARQC, which rather than being a random number is a cryptogram. A cryptogram is designed to appear as a random sequence to anyone who does not have access to the key that was used to generate it. The response received by the card is a cryptographic function of the ARQC and there is only one possible ARPC that fits the ARQC.

Any ARPC that does not match the card's ARQC will be refused. In other words, for a 64 bit ARQC, there is one response which will fit the ARQC and ($2^{64}-1$) responses which will not fit the ARQC. The example described here exploits this fact by defining operations to be carried out by the card, and mapping—onto the ARPC—operation codes that correspond to the required operations.

The first stages 111, 112 are the same as described above for FIG. 5. The initial parts of the transaction authorisation stage 113 are also unchanged. The authorisation entity 120 determines if there is a need to send a data element with the cryptogram ARPC. If there is no need to send a data element with ARPC, a response is computed at block 126, sent 127 to the reader 115, and forwarded 128 to the card 110. If there is a need to send a data element with the ARPC, a modified response is computed at block 130. One reason for sending a modified response is if the authorisation entity's decision is to refuse the transaction. The authorisation entity may execute an additional procedure:

security-action(p1,p2, . . . )=>op-type or null where p1, p2, . . . are security parameters. For example:

security-action(p)=>op3 where p is a blacklist of cards and op3 corresponds to a code that blocks all payment applications. Having the function output a type, rather than an operation code, allows for a more flexible coupling between the action described and the precise operation code that is assigned to a given type of action. For example, in country one type T1 might correspond to an application block operation, whereas in country two it might correspond to a "kill card", i.e. an irreversible disenabling operation. The operation type is associated with an op code, as shown in FIG. 8. An operation type may be associated with more than one op code, such as the per-country example for operation type "T1" described above. When the security-action function returns one of the operation types in a stored table (e.g. see FIG. 8), the authorisation entity computes a modified ARPC by a bit-wise operation between the ARPC and the corresponding 64-bit operation code (OP1, OP2, . . . ):

OPn xor ARPC

The modified cryptogram ARPC' is sent 131 to the reader 115, and forwarded 132 to the card 110 in an EXTERNAL AUTHENTICATE command.

Block 129 is the same as described above. The card verifies the ARPC and ARC received from the issuer in the EXTERNAL AUTHENTICATE command. If the ARPC has been modified at block 130, the modified ARPC (ARPC') received by the card will not verify. The card proceeds to block 133 and performs a bit-wise operation (e.g. xor) between the modified ARPC' and the ARQC computed at block 122:

MAC-algorithm(original-ARQC⊕ARC,K2)xor ARPC=>OPn where OPn is op code n.

An output of this operation is compared with a table of results. If a match is found in the table, the action—or code—corresponding to the entry in the table. The card matches $OP_n$ in its table and executes the corresponding code.

FIG. 7 shows an example table which can be stored at the card. The table can be written to the card as part of the process of card personalisation. The operations—defined by op codes OPn—can be considered entry points to procedures to be executed by the card. The values stored in the op code column correspond to values found by block 133, FIG. 6.

The operations defined by the op codes OPn can be related to the security of the card. They may represent APDU commands defined in the EMV standard, such as UNBLOCK PIN. They may represent actions for which there is no APDU command, such as blocking a payment application, or to block all the applications on the card, or to switch the card from static data authentication (SDA) to dynamic data authentication (DDA).

The card 110 is equipped with a means of executing commands that are received on the I/O interface in the form of APDUs. If, for example OP1, corresponds to one of these commands, then the 'entry point' provides the means for the program that executes these additional operations to execute a card command by calling it internally rather than via an APDU.

In cases where OPn does not correspond to a command that can be called via an APDU, then the 'entry point' can: provide the means for calling an operating system function (e.g. "kill card"), or provide the means for calling a function that is specifically written for achieving the desired effect. Examples of the latter include:

modifying security related limits held in particular files on the card, such data is often referred to as 'risk management' data;

modifying the SDA (Static Data Authentication) certificates.

The operations OP1, etc, can be executed before the response to the APDU that contained the operation code is returned to the reader. Referring again to FIG. 6, the exec(OPn) can be considered as a call within the code of the EXTERNAL AUTHENTICATE command:

```
EXTERNAL AUTHENTICATE {
...
exec(OPn);
...
return response to reader;
}
```

An alternative is to use an event-driven model to implement the control. In this case, the column "entry point" in FIG. 7 can be replaced by "event". Possible events include:
immediately after the return of the command that carries the operation code;
immediately, which is effectively the entry point above;
end of transaction.

The operation codes OPn are the same length as the ARPC, i.e. eight bytes. They could be, for example, random 64-bit strings.

FIG. 8 shows a table of operation codes stored by the authorisation entity 120. The table lists the operation codes OPn against corresponding operation types.

Some variants of the method shown in FIG. 6 will now be described.

Encrypted op Codes

If the operation code (OPx) corresponding to, for example, to an "APPLICATION BLOCK" operation were leaked, it would be open to an attacker to mount a denial of service attack. Suppose the authorisation entity has authorised the transaction by sending an ARPC 127 to the reader. A possible attack if for an attacker to substitute the ARPC sent by the authorisation entity with:

OPx xor ARPC

One defence against this attack is to encrypt the operation code.

$$encrypt(OPn, K3) => \{OPn\}_{K3}$$

where: $\{X\}_K$ means X encrypted under key K.

This means that the result of the operation performed at block 133 is:

$$MAC\text{-}algorithm(original\text{-}ARQC \oplus ARC, K2) \text{ xor } ARPC => \{OPn\}_{K3}$$

A first possibility for the key K3 is a fixed key derived, for example, from K1 as follows:

$$kdf(fixed\text{-}string, K1) => K3$$

In this case, the op codes stored in table of results held by the card are replaced by the encrypted versions of those codes, e.g. $\{OP1\}_{K3}$, $\{OP2\}_{K3}$, etc. when the table is written to the card during the card personalisation process. On the server side, the authorisation entity would either need to hold a table for each card, or to derive the key when it is required. The option of deriving the key when it is required is preferable as it minimises storage requirements.

A second possibility for the key K3 is to use a key unique to the transaction. In this case the key K2 could be used, and to add an extra step to recover the operation code:

$$decrypt(\{OP_n\}_{K2}, K2) => OPn$$

Operation Types

The mapping between the operation type and the authorisation entity security-action is described above as:

$$security\text{-}action(p1, p2, \ldots) => operation\text{-}type$$

In a variant, the information in the parameters, p1, p2, etc. comes at least partly from the card. At A' in FIG. 9 the reader sends a command to the card to read information from the card's log file. The reader forwards this information on to the issuing bank (authorisation entity), shown as card log data. The data received from the card allows a mapping to an operation type. In another example, data received from the card can be used to map directly to an op code.

Figure 9:
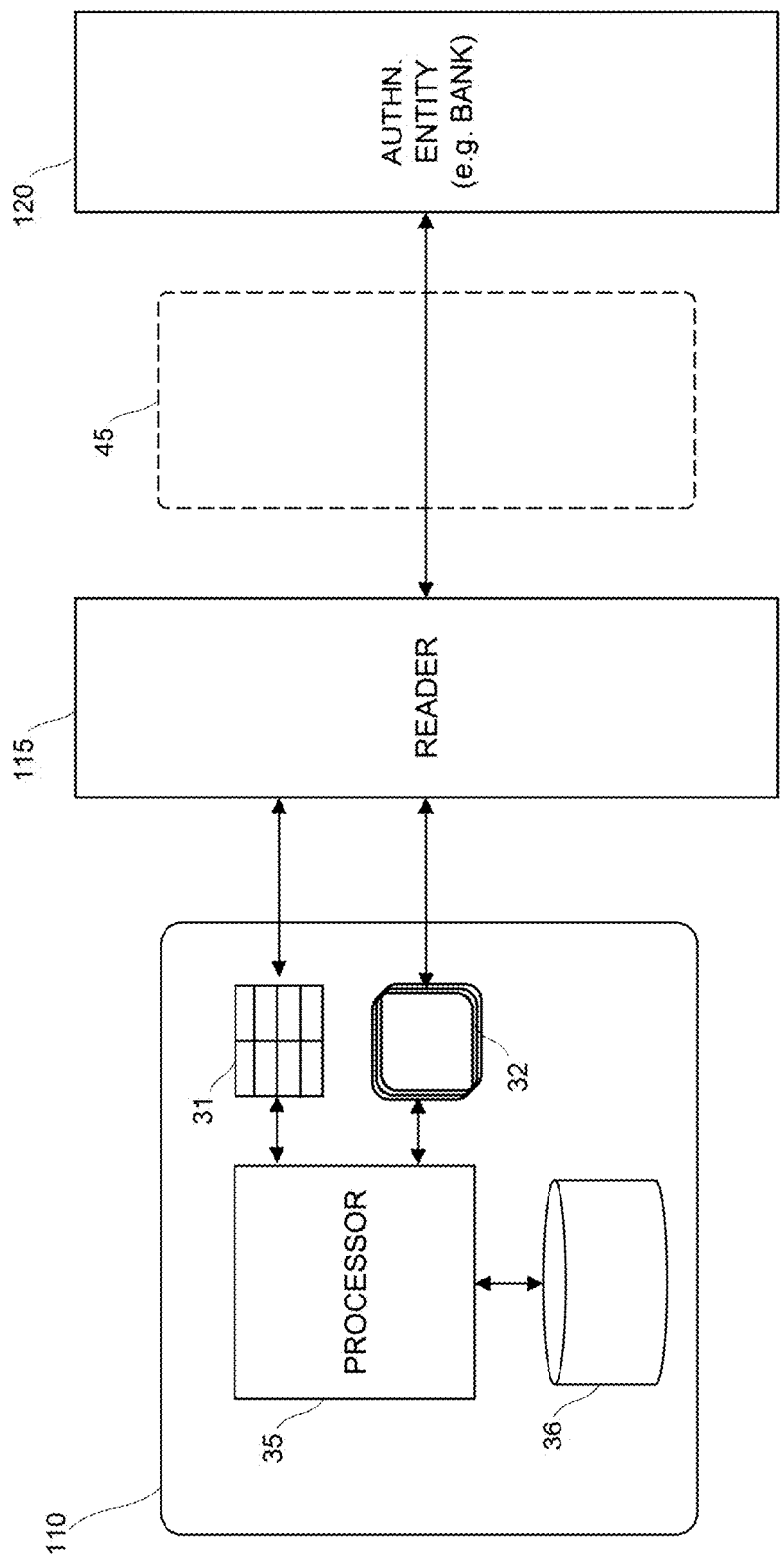
FIG. 9 shows an integrated circuit card (ICC), a card reader and authorisation entity which can be used to implement one of the methods.

FIG. 9 shows an example of an integrated circuit card (ICC) 110, or chip card which can be configured to perform the method described above. The chip card 110 comprises a processor 35 which is operatively connected to storage 36. The chip card 110 has at least one external interface 31, 32 for communicating with an external card reader 115. The external interfaces may be a contact interface 31 and/or a contactless interface 32. Communication with the external card reader 50 is typically via ISO 7816 APDUs. The reader 115 communicates with the authorisation entity 120 via a network.

External/Mutual Authentication

Figure 10:
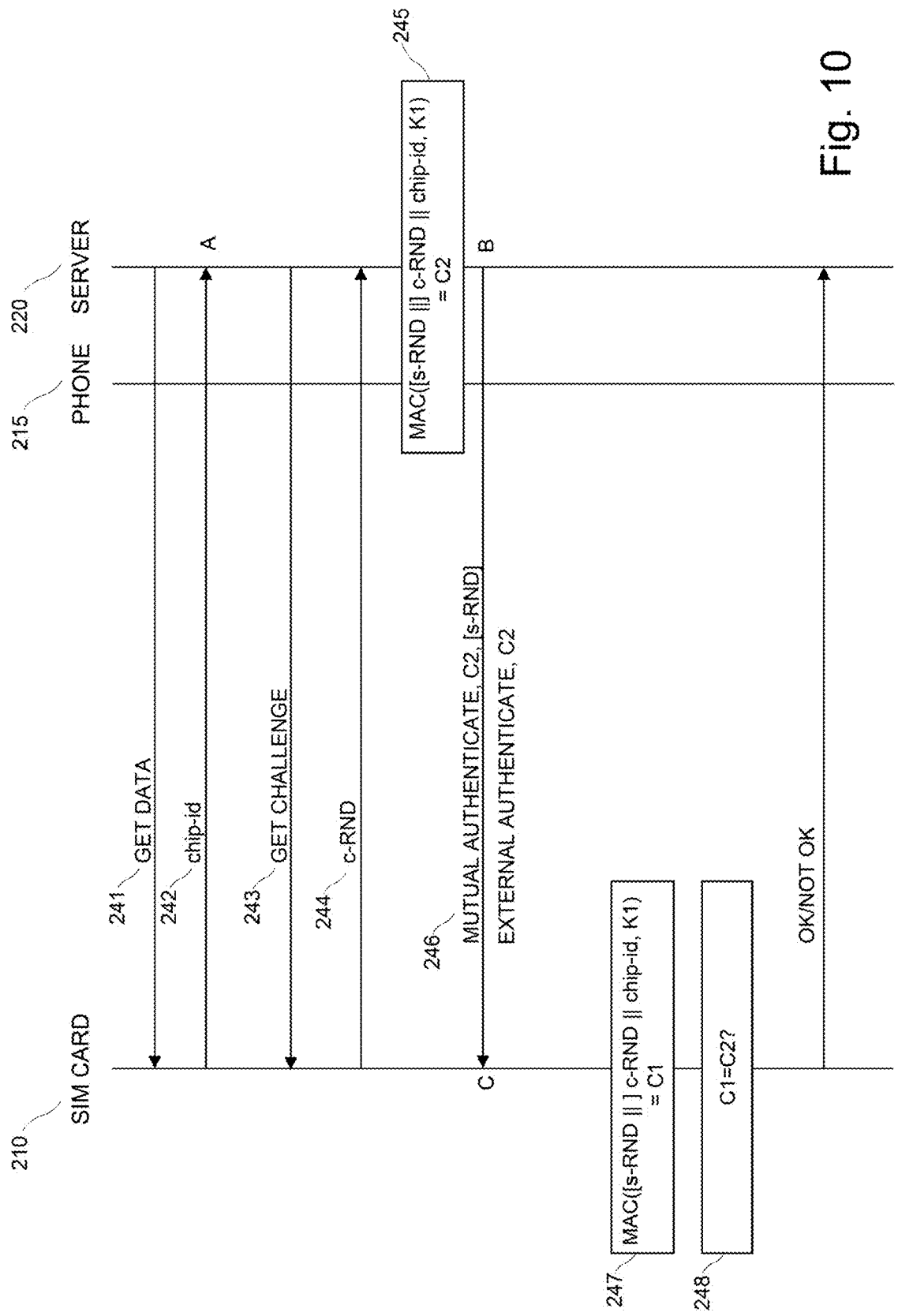
FIG. 10 shows a known authentication exchange between a sim card and a phone/server.
Figure 11:
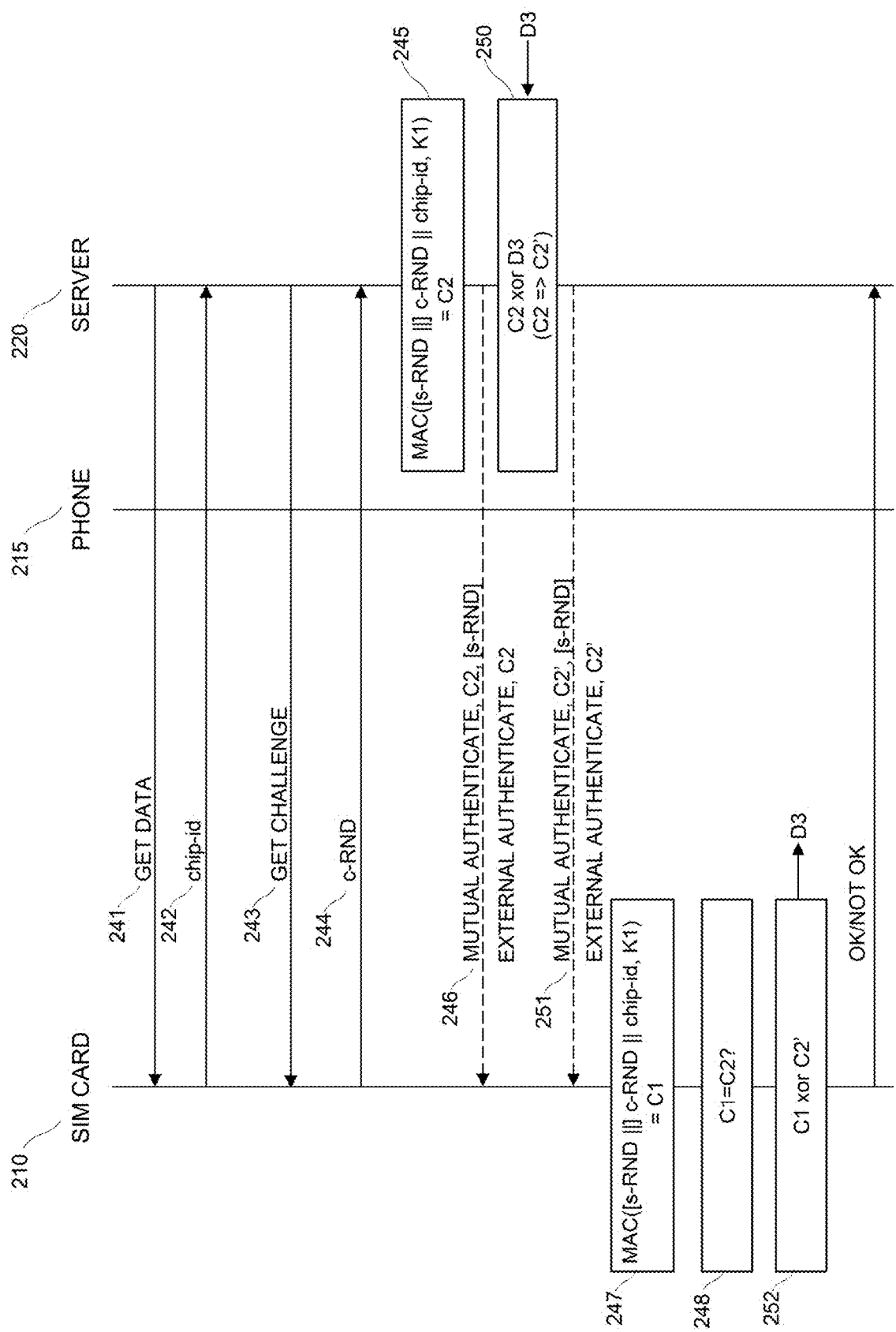
FIG. 11 shows an example of a modified authentication exchange between a SIM card and a phone/server.

One application of the method shown in FIG. 2 is as part of a communication exchange for external, or mutual, authentication. This can occur between an ICC, such as a Subscriber Identity Module (SIM), a device hosting the SIM (e.g. a phone) and a server. Chip cards and similar 'secure elements' that communicate by exchanging commands and responses, such as defined in ISO 7816, mostly receive the challenge from a terminal and reply with the challenge encrypted under a shared or complementary key. This is how, for example, the ISO 7816 INTERNAL AUTHENTICATE command works. Successful execution of an INTERNAL AUTHENTICATE command allows the terminal to assert that the card is authentic (has a copy of the authentication key). But it does not allow the card to assert anything about the terminal. If the card needs to check the terminal, the card must send the challenge and the terminal return the encrypted response. When the authentication is carried out in both directions, it is called mutual authentication. The ISO 7816 MUTUAL AUTHENTICATE command provides for mutual authentication between card and terminal in accordance with ISO/IEC 9798:

Before describing an example of a mutual authentication exchange using the method of FIG. 2, it is helpful to review a known mutual authentication exchange in FIG. 10. In FIG. 11 a SIM card 210 is connected to a mobile equipment (e.g. a cell phone), which in turn connects to a server that is part of a mobile phone network.

At A in FIG. 10, the server re-generates the card key, using the master key K0:

$$kdf(chip\text{-}id, K0) => K1$$

As described above, it is standard practice to derive the card key from a master key K0. At block 245 the server concatenates a random number of its own s-RND, the card random number, c-RND, and the chip-id and generates a MAC over the result:

$$MAC\text{-}algorithm(s\text{-}RND \| c\text{-}RND \| chip\text{-}id, K_1) => authentication\text{-}cryptogram$$

where the operation "||" is a combination or concatenation. At B, the server 220 sends the MUTUAL AUTHENTICATION command 246 to the card 210. The MUTUAL AUTHENTICATION command 246 includes the s-RND in plain text. At C, the card 210 generates a cryptogram using its own key K1 and compares the result with the authentication-cryptogram received from the server:

if $MAC\text{-}algorithm(s\text{-}RND \| c\text{-}RND \| chip\text{-}id, K_1)$=authentication-cryptogram,OK.

FIG. 11 shows how the known mutual authentication exchange can be modified such that the cryptogram carries a data element. Steps up to block 245 are the same as shown in FIG. 11. Additionally, the server 220 and the card 210 both hold operation code tables as previously described. The server 220 executes a security-action procedure:

security-action(p1,p2, . . . )=>op-type or null

In the event that the return value is an op-type, the server 220 matches the op-type with the corresponding 64-bit op-code and, at block 250, combines the op-code with the authentication cryptogram:

OPn xor cryptogram

At B, the server 220 sends the MUTUAL AUTHENTICATION command to the card 210. The MUTUAL AUTHENTICATION command includes the s-RND in plain text. At C, the card 210 generates a cryptogram using its own key K1 and compares the result with the authentication-cryptogram received from the server:

if MAC-algorithm(s-RND||c-RND||chip-id,$K_1$)=authentication-cryptogram,OK,else check-for-operation-code The "check-for-operation-code" is similar to described earlier:

MAC-algorithm(s-RND||c-RND||chip-id,$K_1$)xor authentication-cryptogram=>$OP_n$

Once the card has recovered the operation code, the associated operation is executed as described above.

An advantage of an example described above is that an additional data element (representing a security action, or more generally an operation code or command) can be sent in a way which is entirely transparent. An observer on the reader cannot tell that the card has executed an additional command. By contrast, an issuer script is always visible to an observer on the reader. While the EMV standard provides for encryption of the command data, the other components of the commands are in clear text. The card 210 and the server 220 can use a different computation algorithm at blocks 245, 247 from the ones described here.

Figure 12:
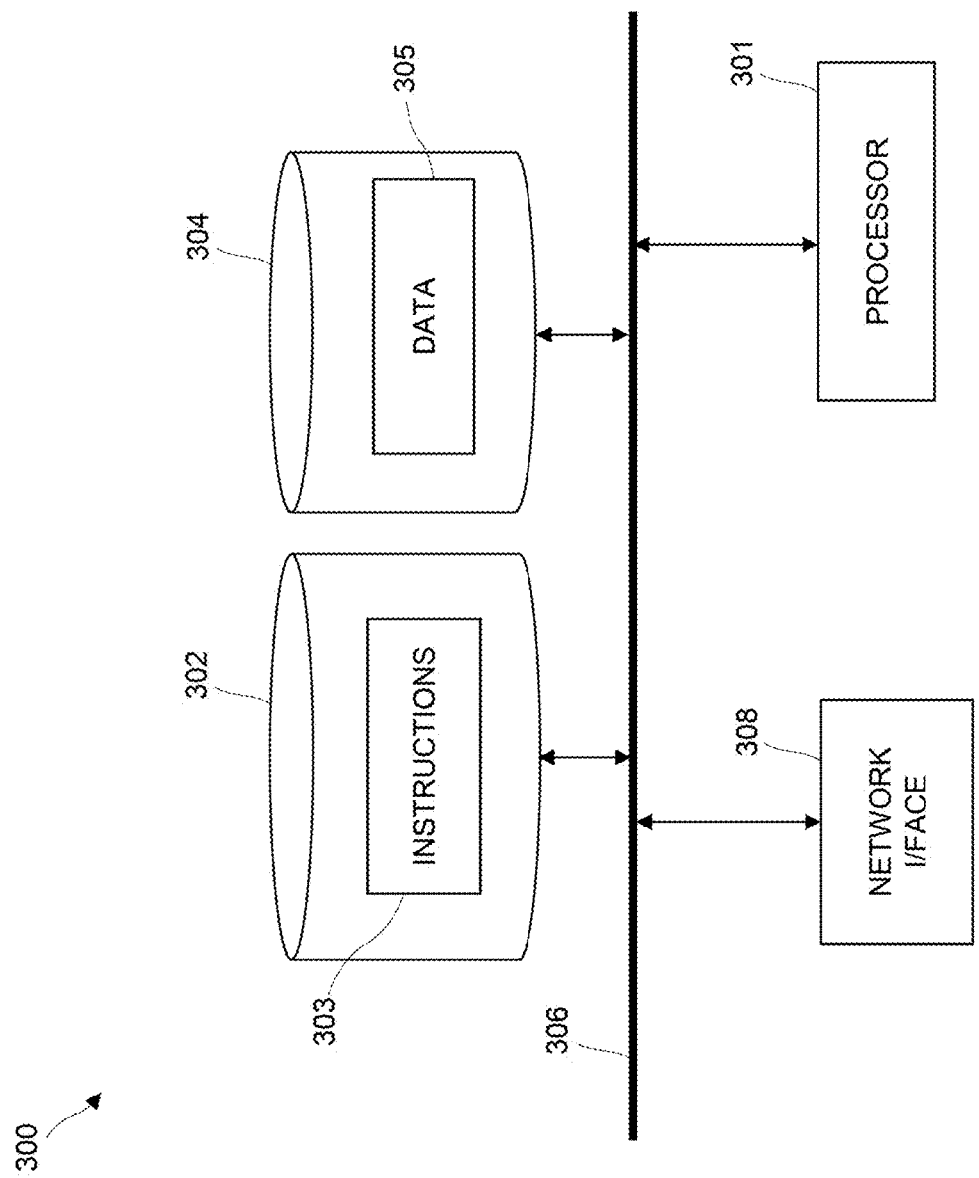
FIG. 12 shows apparatus for a computer-based implementation.

FIG. 12 shows an example of processing apparatus 300 which may be implemented as any form of a computing and/or electronic device, and in which embodiments of the system and methods described above may be implemented. Processing apparatus 300 can be provided at one of the parties 10, 20, at the card 110, 210, at the authorisation entity 120, or at the server 220. The processing apparatus may participate in any of the methods described above. Processing apparatus 300 comprises one or more processors 301 which may be microprocessors, microcontrollers or any other suitable type of processors for executing instructions to control the operation of the device. The processor 301 is connected to other components of the device via one or more buses 306. Processor-executable instructions 303 may be provided using any computer-readable media, such as memory 302. The processor-executable instructions 303 can comprise instructions for implementing the functionality of the described methods. The memory 302 is of any suitable type such as non-volatile memory, read-only memory (ROM), random access memory (RAM), a storage device of any type such as a magnetic or optical storage device. Memory 302, or an additional memory 304, can be provided to store data 305 used by the processor 301. The data 305 can comprise a table of op codes shown in FIGS. 7 and 8, keys, transaction data. The processing apparatus 300 comprise one or more communication interfaces 308.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An authentication method performed between a first party (10) and a second party (20), the first party (10) having a first key and the second party having a second key, the method comprising, at the first party (10):
    (i) determining a challenge (11);
    (ii) sending the challenge to the second party (20);
    (iii) receiving a response from the second party (20) comprising a second cryptogram (C2; ARPC);
    (iv) computing (17) a first cryptogram (C1) using the challenge and the key of the first party; and
    (v) determining (18) whether the first cryptogram (C1) matches the second cryptogram (C2; ARPC) received from the second party (20),
    wherein, in a case where if the first cryptogram (C1) does not match the second cryptogram (C2; ARPC):
        a computation (19) is performed using the first cryptogram (C1; ARQC) and the second cryptogram (C2'; ARPC'); and
        a result of the computation is compared with a stored set of results to recover a first data element (D1; OPn) carried by the second cryptogram (C2'; ARPC').

2. The method according to claim 1, wherein performing a computation using the first cryptogram (C1; ARQC) and the second cryptogram (C2'; ARPC') comprises performing a bit-wise operation between the first cryptogram (C1; ARQC) and the second cryptogram (C2; ARPC').

3. The method according to claim 2, wherein the bit-wise operation is an exclusive OR, XOR, operation.

4. The method according to claim 1, wherein the first data element (D1; OPn) is indicative of a security action to be performed by the first party, and the method further comprises performing the security action according to the value of the recovered first data element (D1; OPn).

5. The method according to claim 1, wherein the stored set of results are operation codes (OPn).

6. The method according to claim 1, wherein the first data element (D1; OPn) is received as part of a command received at the first party (10) and wherein the data element (D1; OPn) is used to perform an action at the first party before sending a response externally of the first party.

7. The method according to claim 1, wherein the stored set of results are a set of operation codes encrypted using a further key, wherein performing a computation using the first cryptogram (C1; ARQC) and the second cryptogram (C2'; ARPC') provides an encrypted value which is encrypted using a key corresponding to the further key.

8. The method according to claim 1, wherein the challenge (11) comprises a second data element (D2; c-RND).

9. The method according to claim 1, wherein:
    the challenge comprises a third cryptogram (C3; ARQC) computed using a second data element (D2; T; c-RND) and the key of the first party;
    the response from the second party (20) further comprises a third data element (D3; ARC; s-RND); and
    step (iv) comprises computing the first cryptogram (C1) using the third cryptogram (C3; ARQC), the third data element (D3; ARC; s-RND) and the key of the first party.

10. The method according to claim 9, wherein:
the third cryptogram is an Authorisation Request Cryptogram, ARQC;
the second cryptogram is an Authorisation Response Cryptogram, ARPC;
the second data element is transaction data; and
the third data element is an Authorisation Response Code, ARC.

11. The method according to claim 1, wherein the first party (10) is an integrated circuit card, ICC, the second party (30) is an authorisation entity, and the method is a transaction authorisation method between the integrated circuit card (10) and the authorisation entity (30).

12. An authentication method performed between a first party (10) and a second party (20), the first party (10) having a first key and the second party having a second key, the method comprising, at the second party (20):
(i) receiving a challenge (11) from the first party (10);
(ii) computing a second cryptogram (C2; ARPC) using the challenge and the key of the second party; and
(iii) determining whether the second cryptogram (C2; ARPC) is required to carry a first data element (D1),
wherein, in a case where if the second cryptogram (C2; ARPC) is not required to carry the first data element (D1), the second cryptogram (C2; ARPC) is sent to the first party, and
wherein, in a case where if the second cryptogram (C2) is required to carry the first data element (D1):
a computation of the second cryptogram (C2; ARPC) is performed with the first data element (D1; OPn) to produce a modified second cryptogram (C2'; ARPC'); and
the modified second cryptogram (C2'; ARPC') is sent to the first party, wherein the first data element (OPn) is recoverable from the modified second cryptogram (C2'; ARPC') by the first party.

13. The method according to claim 12, wherein performing a computation of the second cryptogram (C2; ARPC) with the first data element (D1; OPn) comprises performing a bit-wise operation between the second cryptogram (C2; ARPC) and the first data element (D1; OPn).

14. The method according to claim 12, wherein the first data element (D1; OPn) is indicative of a security action to be performed by the first party.

15. The method according to claim 12, wherein:
the challenge comprises a third cryptogram (C3; ARQC);
step (ii) comprises computing the second cryptogram (C2; ARPC) using the third cryptogram (C3; ARQC), a third data element (D3; ARC; s-RND) and the key of the second party; and
the method further comprises sending the third data element (D3; ARC; s-RND) to the first party (10).

16. An apparatus for use at a first party (10, 110) comprising a processor and a memory, the memory containing instructions executable by the processor whereby the apparatus is configured to:

(i) determine a challenge (11);
(ii) send the challenge to a second party (20);
(iii) receive a response from the second party (20) comprising a second cryptogram (C2; ARPC);
(iv) compute (17) a first cryptogram (C1) using the challenge and a key of the first party; and
(v) determine (18) whether the first cryptogram (C1) matches the second cryptogram (C2; ARPC) received from the second party (20),
wherein, in a case where the first cryptogram (C1) does not match the second cryptogram (C2; ARPC):
a computation (19) is performed using the first cryptogram (C1; ARQC) and the second cryptogram (C2'; ARPC'); and
a result of the computation is compared with a stored set of results to recover a first data element (D1; OPn) carried by the second cryptogram (C2'; ARPC').

17. An apparatus for use at a second party (20, 120) comprising a processor and a memory, the memory containing instructions executable by the processor whereby the apparatus is configured to:
(i) receive a challenge (11) from a first party (10);
(ii) compute a second cryptogram (C2; ARPC) using the challenge and a key of the second party; and
(iii) determine whether the second cryptogram (C2; ARPC) is required to carry a first data element (D1),
wherein, in a case where the second cryptogram (C2; ARPC) is not required to carry the first data element (D1), the second cryptogram (C2; ARPC) is sent to the first party, and
wherein, in a case where the second cryptogram (C2) is required to carry the first data element (D1):
a computation of the second cryptogram (C2; ARPC) is performed with the first data element (D1; OPn) to produce a modified second cryptogram (C2'; ARPC'); and
the modified second cryptogram (C2'; ARPC') is sent to the first party, wherein the first data element (OPn) is recoverable from the modified second cryptogram (C2'; ARPC') by the first party.

18. The method according to claim 2, wherein the first data element (D1; OPn) is indicative of a security action to be performed by the first party, and the method further comprises performing the security action according to the value of the recovered first data element (D1; OPn).

19. The method according to claim 3, wherein the first data element (D1; OPn) is indicative of a security action to be performed by the first party, and the method further comprises performing the security action according to the value of the recovered first data element (D1; OPn).

20. The method according to claim 2, wherein the stored set of results are operation codes (OPn).

* * * * *